United States Patent

Morizane et al.

[11] Patent Number: 6,048,466
[45] Date of Patent: Apr. 11, 2000

[54] METHOD OF CLEANING GLASS SUBSTRATE FOR MAGNETIC DISK OR SEMICONDUCTOR SUBSTRATE

[75] Inventors: Toshinori Morizane; Masao Kawaguchi, both of Tokyo; Tadao Tokushima, Hamamatsu, all of Japan

[73] Assignee: Fine Glass Technology Co., Ltd., Tokyo, Japan

[21] Appl. No.: 09/044,228

[22] Filed: Mar. 19, 1998

[30] Foreign Application Priority Data

Aug. 20, 1997 [JP] Japan ................................ 9-238923

[51] Int. Cl.[7] .................. B08B 6/00; C25F 1/00; C25B 9/00; B01D 17/06; B44C 1/22
[52] U.S. Cl. ................... 216/24; 134/1.1; 134/1.2; 134/1.3; 134/3; 204/263; 205/705; 216/97
[58] Field of Search ................. 216/24, 97; 134/1.1, 134/1.2, 1.3, 3; 204/263; 205/705

[56] References Cited

U.S. PATENT DOCUMENTS

| | | | |
|---|---|---|---|
| 5,543,030 | 8/1996 | Shiramizu et al. | 205/464 |
| 5,578,193 | 11/1996 | Aoki et al. | 205/746 |
| 5,635,053 | 6/1997 | Aoki et al. | 205/746 |
| 5,676,760 | 10/1997 | Aoki et al. | 134/1.3 |
| 5,725,753 | 3/1998 | Harada et al. | 205/746 |
| 5,783,790 | 7/1998 | Mitsumori et al. | 204/157.15 |
| 5,833,831 | 11/1998 | Kitajima et al. | 205/349 |

FOREIGN PATENT DOCUMENTS

| | | | |
|---|---|---|---|
| 09024350 | 1/1997 | Japan | 205/746 |
| 10015509 | 1/1998 | Japan | 205/746 |

OTHER PUBLICATIONS

Aoki, et al.; "Wafer Process Using electrolysis Ionized Water," SEMI Technology Symposium, 1993, pp. 489–496.

*Primary Examiner*—Steven P. Griffin
*Assistant Examiner*—Cam N. Nguyen
*Attorney, Agent, or Firm*—Oblon, Spivak, McClelland, Maier & Neustadt, P.C.

[57] ABSTRACT

To propose a method of cleaning a surface of a glass substrate fabricated by a process of strengthening a surface thereof by alkaline ion exchange reaction by selectively removing alkaline metal on the surface by cleaning the surface by using an activated ionic water produced by electric polarization and as a result, to provide a glass substrate for a magnetic disk having a magnetic medium with insignificant corrosion and excellent S/N ratio, in cleaning a glass substrate for a magnetic disk using a glass substrate pulled up from a chemically strengthening treatment solution produced by an alkaline ion exchange reaction, after a final polishing step of fabricating the glass substrate for a magnetic disk, the glass substrate is cleaned by an activated anodically electrolyzed water produced by electric polarization to thereby selectively remove the alkaline metal at the vicinity of the surface.

5 Claims, 1 Drawing Sheet

METHOD OF CLEANING GLASS SUBSTRATE FOR MAGNETIC DISK OR SEMICONDUCTOR SUBSTRATE

BACKGROUND OF THE INVENTION

1. Field of the Invention

The present invention relates to fabrication of a glass substrate for a magnetic disk used in a hard disk or the like used as a large scale record medium of a computer, particularly to a method of cleaning a glass substrate for a magnetic disk using a glass substrate pulled up from a chemically strengthening treatment solution produced by an alkaline ion exchange.

2. Description of the Related Art

Although conventionally, a substrate which uses an aluminum alloy and the surface of which is plated with nickel and phosphor has widely been used in recent years as a substrate for a magnetic disk, the demand for a glass substrate has been increasing owing to necessities of small size formation of, a hard disk drive, high recording density of a disk, as well as low flying height of a magnetic head to achieve the high density, promotion of impact resistance and the like in.

Properties of withstanding centrifugal force caused by rotation of a disk drive and impact force caused by collision with a magnetic head and the like are required for a glass substrate for a magnetic disk and a glass substrate having large mechanical strength different from ordinary glass is necessary.

In order to satisfy the above-described mechanical strength, there has been used a glass substrate of crystallized glass having a structure in which fine crystals are dispersed and strength is provided by strain caused by dispersion, or a glass substrate of an ion strengthening type in which after fabricating a glass substrate in a predetermined shape, an alkaline metal (for example, $K^+$) having a large ionic radius is permeated to a surface of the glass substrate by thermal diffusion which provides large compressive stress caused by a difference in ionic radii at the surface of the glass substrate to thereby strengthen the glass substrate.

Particularly, in recent years with high density recording of memory elements on a hard disk accompanied by using an MR head (magnetic resistance head) and a GMR head (giant magnetic resistance head), in correspondence therewith, it is necessary for the magnetic head to have a smooth face to a degree that a flying height the magnetic head above the surface of the disk substrate falls in a region of lower than 300 A (Angstrom).

However, the size of crystals of the crystallized glass is in the magnitude of a micrometer order and therefore, there has been arisen a problem in which the roughness of the surface which originally is smooth becomes varied in the order of micrometers due to a difference in hardnesses of an amorphous matrix shape and crystals or a difference in chemical properties thereof. This gives rise to a problem in which when such a glass substrate is used in a magnetic disk, so-to-speak low flying height where a head of the MR head or the GMR head or the like is floated up proximate to the magnetic disk is difficult to carry out, or in respect of the head, in the case of so-to-speak narrow track formation where a memory track is formed in a narrow region with high density recording of the magnetic disk, so-to-speak modulation (adjustment node) is observed in reproduced output. In the case of a magnetic disk using the above-described crystallized glass by avoiding such a problem, it is difficult to provide the surface of the disk substrate with predetermined smooth face accuracy.

As a result, at present, use of crystallized glass is shunned in a magnetic disk and strengthened glass produced by alkaline ion exchange has widely been used. However, according to a hard disk using strengthened glass produced by alkaline ion exchange, when a disk is driven in the case where the MR head or the GMR head is used, in respect of a limit in recording density, in view of medium noise, a magnetic memory layer on the surface of the disk substrate is made as thin as below 100 A (Angstrom) and further, a protective film formed on the surface is made as thin as about 50 A (Angstrom) although conventionally, about 150 A (Angstrom) has been needed in order to reduce space loss owing to a medium of the head per se.

Particularly, in respect of the medium noise, factors for determining the medium noise are surface smoothness of a glass substrate and moisture adsorbed to the glass substrate in a step of sputtering a magnetic film. That is, the glass substrate is cleaned immediately before entering a medium fabrication step and when an alkaline component is present on the surface of the glass substrate, moisture is liable to adsorb and the S/N (signal to noise) ratio that is one of medium properties is deteriorated by adsorbed moisture.

Moreover, when an alkaline component is present on the surface of a glass substrate, the alkaline component is made to permeate into a magnetic film formed on the surface of the glass substrate thereby causing corrosion. When particularly, sodium ions are present among several alkaline components, in forming a film of a memory medium or after forming the film, difficulties are caused resulting in the worst state of deterioration of the memory medium layer or the like.

Therefore, it has conventionally been proposed, in cleaning a glass substrate immediately before a medium fabrication step to clean the glass substrate by sulfuric acid and phosphoric acid solution immediately after chemical treatment of glass to thereby remove an alkaline component on the surface (Japanese Unexamined Patent Publication No. JP-A-9-22525)

Further, although in fabricating a glass substrate having a surface roughness of about Ra 10–20 A (Angstrom), it is not so much necessary to take into consideration of the above-described presence of alkaline component, particularly, presence of sodium ions, in the case of a glass substrate having a surface roughness of Ra 5 A (Angstrom) or less that is needed in recent years, a final polishing step is necessary to provide a smaller surface roughness. However, when surface polishing is carried out on the glass substrate at a final step, in respect of the polished surface, as a result of polishing, a new surface is exposed and accordingly, the concentration of an alkaline component present on the surface of the glass substrate is not reduced. Further, when micro cracks which are fine cracks of the glass substrate are present, in the polishing step, a polishing solution or the like permeates the micro cracks and as a result, corrosion of a medium on the surface is caused in a magnetic disk composed of the glass substrate and constituting a product.

Further, even when the surface is cleaned by using normal acid or the like to remove the alkaline component on the surface after the final polishing step, in this case, although the alkaline component can be removed, the surface roughness is deteriorated by a treatment using a solution including acid. Further, a new cleaning step is necessary to remove acidic component remaining on the surface of the glass substrate. Also, when cleaning by acid is carried out, in this case, a component mainly of acid remains on the surface, or permeates into micro cracks of the glass substrate and these substances remaining on the surface or permeating into micro cracks mix into a film of a magnetic recording medium in sputtering the magnetic recording medium resulting in deteriorating the SN ratio of the medium similar to the above-described case.

SUMMARY OF THE INVENTION

It is an object of the present invention to obviate the above-described problems in the conventional technology. The inventive method comprises a step of carrying out an ion exchange reaction for a predetermined period of time in a molten alkaline ion salt bath after polishing a strengthened glass substrate of an alkaline ion exchange type to predetermined dimensions, a step of removing an alkaline salt adhered to the surface of the glass substrate by dissolving it by normal acid, a final polishing step of blowing a polishing solution to the surface until the surface roughness Ra of the glass substrate is reduced to 5 A (Angstrom) or less, a step of dipping the glass substrate for a predetermined period of time into an anodically electrolyzed water including hydronium ions at a predetermined concentration, a step of thereafter cleaning the glass substrate with high purity water and a step of drying the glass substrate after cleaning the glass substrate with high purity water.

That is, according to a first aspect of the present invention, in a method of cleaning a glass substrate for a magnetic disk, the feature particularly resides in that a glass substrate for a magnetic disk using a glass substrate pulled up from a chemically strengthening treatment solution produced by alkaline ion exchange is cleaned by an activated ionic water produced by electric polarization to thereby remove selectively an alkaline metal on the surface of the substrate.

Further, according to a second aspect of the present invention, in the method of cleaning a glass substrate for a magnetic disk in respect of the first aspect, the feature resides in that the activated ionic water is an anodically electrolyzed water.

Further, according a third aspect of the present invention, in the method of cleaning a glass substrate for a magnetic disk in respect of the first aspect, the feature resides in that the activated ionic water is an anodically electrolyzed water having a hydrogen ion concentration of pH of 5–6.

Further, according to a fourth aspect of the present invention, in a method of making a glass substrate for a magnetic disk using a glass substrate pulled up from a chemically strengthening treatment solution produced by an alkaline ion exchange, the feature resides in that after a polishing step at a final fabrication stage of finishing the glass substrate to a predetermined surface roughness, the glass substrate is dipped for a predetermined period of time into an activated ionic water produced by an electric polarization to thereby selectively remove an alkaline component on the surface of the glass substrate.

DETAILED DESCRIPTION OF PREFERRED EMBODIMENTS

Figure 1A:
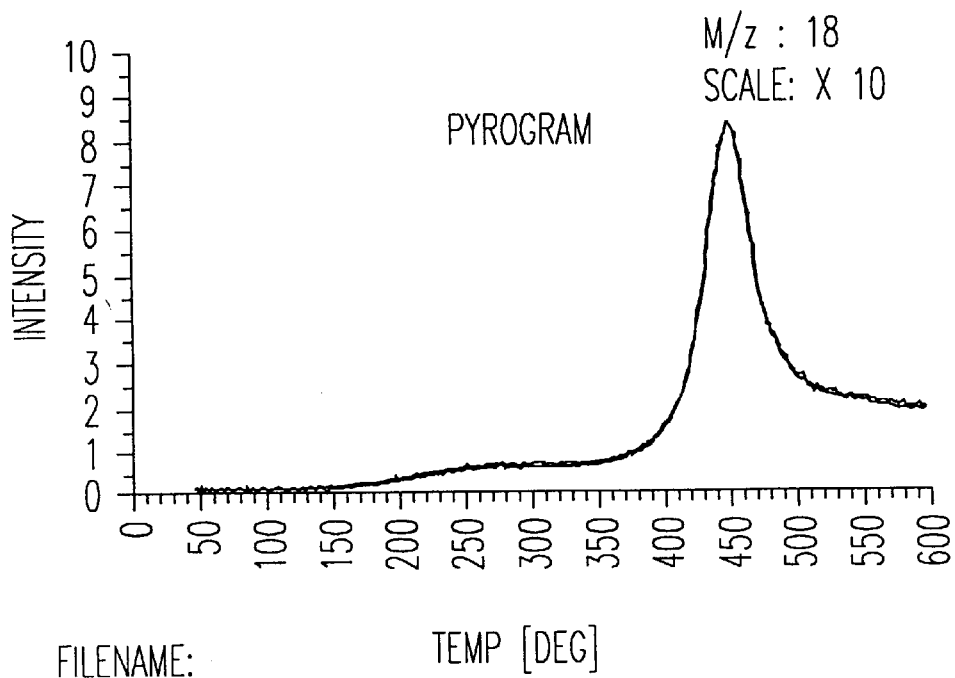
FIGS. 1(a) and 1(b) are diagrams showing states of adsorption of moisture caused by dipping a glass substrate for a magnetic disk into an anodically electrolyzed water which is carried out before sputtering the glass substrate.

Firstly, pellets are produced by melting oxides having the following chemical compositions for glass of an alkaline ion exchange strengthening type.

| | | |
|---|---|---|
| $SiO_2$ | 62.4 | WT % |
| $Al_2O_3$ | 3.0 | |
| $B_2O_3$ | 1.1 | |
| $Na_2O$ | 9.0 | |
| $K_2O$ | 9.0 | |
| MgO | 3.0 | |
| ZnO | 12.0 | |
| $TiO_2$ | 0.6 | |
| $As_2O_3$ | 0.2 | |
| $Sb_5O_3$ | 0.3 | |

Next, produced pellets are compressed to a predetermined size by a hot press to provide a glass material substrate having no bubbles. Further, the substrate is fabricated into predetermined dimensions after processing it by machining of inner and outer peripheries, rough polishing and fine polishing.

Next, the fabricated glass material substrate is subjected to an ion exchange reaction at temperature of 400° C. for 3–5 hours in a molten salt including sodium nitrate and the like to thereby form a strengthened layer of about 40 micrometers on the surface of the glass material substrate. After forming the strengthened layer, the surface of the glass material substrate is polished to a surface roughness of Ra of 5 A (Angstrom) or less by using a polishing agent of colloidal silica or the like. After polishing, the substrate is dipped into a solution of $KMnO_4$ and is cleaned by flowing water to remove organic substances on the surface of the glass material substrate.

The glass material substrate is dipped for a predetermined period of time into an anodically electrolyzed water (hereinafter, occasionally referred to also as "activated ionic water") having various ion concentrations and thereafter, the substrate is cleaned by high purity water, spin drying is carried out by rotating the glass material substrate per se, thereafter, the substrate is subjected to a corrosion resistance test at 80° C. and 90% RH (Relative Humidity) for 10 days and the surface roughness of glass substrate is measured in respect of a maximum projection amount. Table 1 shows a state of treatment of the glass substrate by ionic water.

TABLE 1

| Glass substrate treatment by ionic water | | | | |
|---|---|---|---|---|
| Ion concentration (pH) | Dipping condition | | Initial roughness Ra | Rp |
| No treatment | | | 3 | 18 |
| 1 | Room temperature | 1 min. | 12 | 248 |
| 2 | Room temperature | 2 mins. | 7 | 33 |
| 3 | 80° C. | 1 min. | 4 | 24 |
| 4 | 80° C. | 2 mins. | 3 | 16 |
| 5 | Room temperature | 1 min. | 3 | 17 |
| 6 | Room temperature | 2 mins. | 3 | 16 |
| 5 | 80° C. | 1 min. | 5 | 23 |
| 6 | 80° C. | 2 mins. | 6 | 94 |
| 9 | Room temperature | 1 min. | 7 | 31 |
| 9 | 80° C. | 2 mins. | 5 | 32 |

In Table 1, notation Ra designates a center line average roughness at initial stage which is a value calculated by sampling a portion of a length of measurement from a roughness curve in a direction of the center line and arithmetically averaging the absolute value of a deviation of the center line at the sampled portion from the roughness curve and notation Rp designates a center line height which is one of parameters for evaluating wear resistance or the like which is a value calculated by sampling a portion of a length of measurement from the roughness curve in the center line direction indicating an interval between the center line of the sampled portion and a straight line passing a highest peak in parallel to the center line of the sampled portion.

As is known from Table 1, even when the substrate is dipped into an anodically electrolyzed water having the ion concentration of PH of about 5–6, the surface roughness of the glass substrate is not deteriorated by the treatment.

Further, in respect of the glass substrate which has been treated ionically, a test is carried out at 80° C. and RH 90% for 10 days which is a kind of references for evaluating a semiconductor whereby a maximum surface projection on the surface of the glass substrate is verified.

Table 2 shows a result of verification.

TABLE 2

Maximum projection amount after corrosion resistance test at 80° C. & 90% RH for 10 days

| Ion concentration (pH) | Dipping condition | | Maximum projection amount A |
|---|---|---|---|
| No treatment | | | 3400 |
| 1 | Room temperature | 1 min. | 608 |
| 2 | Room temperature | 2 mins. | 520 |
| 3 | 80° C. | 1 min. | 5500 |
| 4 | 80° C. | 2 mins. | 6400 |
| 5 | Room temperature | 1 min. | 200 |
| 0 | Room temperature | 2 mins. | 480 |
| 5 | 80° C. | 1 min. | 2400 |
| 6 | 80° C. | 2 mins. | 6100 |
| 9 | Room temperature | 1 min. | 3400 |
| 9 | 80° C. | 2 mins. | 3100 |

Generally, when the surface of glass substrate of an alkaline ion exchange strengthening type is treated in a state of high pH ion concentration, the matrix is deteriorated and corrosion of the surface of the glass substrate is expedited. It is n from Table 2 that when the surface of the glass substrate is treated by an anodically electrolyzed water having a pertinent pH concentration, that is, an anodically electrolyzed water having a pH concentration (ion concentration) of 5–6 according to the embodiment, the glass the glass substrate is not deteriorated, an alkaline metal present on the surface of the glass substrate is removed and as a result, the corrosion resistance of the glass substrate is rather promoted.

Further, the glass substrate treated by dipping into an anodically electrolyzed water having an ion concentration of about pH of 5–6, is provided with a low concentration of alkali on the surface of the substrate and therefore, the glass substrate is suitable for a high density magnetically recording medium having a small amount of adsorbed water. Hence, degassing measurement is carried out by using a quadrapole mass spectrometer in respect of a glass substrate which has been treated as described above and an untreated glass substrate and gas generation from the glass substrate is verified. According to the degassing measurement, substrates which have been cleaned by high purity water and dried by spin drying that is a normal pretreatment before a step of sputtering a magnetic disk, are heated in vacuum and are subjected to gas analysis by the quadrapole mass spectrometer. The result is shown in FIGS. 1(a) and 1(b).

Figure 1B:
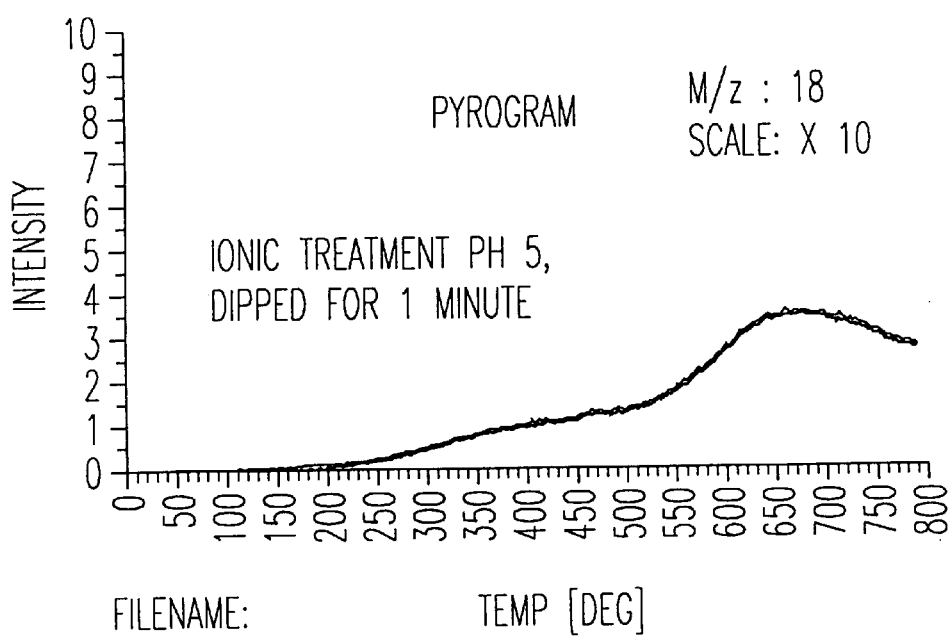

FIGS. 1(a) and 1(b) show states of moisture adsorption present on the above-described surfaces by dipping glass substrates for magnetic disks into an anodically electrolyzed water which is carried out prior to sputtering the substrates.

FIG. 1(a) is a graph showing gas generation in a case where no treatment by ionic water is carried out whereas FIG. 1(b) is a graph showing gas generation in a case where a glass substrate is treated by dipping it for 1 minute in an anodically electrolyzed water having pH 5. As known from FIGS. 1(a) and 1(b), in the case where no treatment by ionic water is carried out, significant gas generation is observed at the vicinity of temperature of 450° C. whereas in the case where the glass substrate is dipped in anodically electrolyzed water having pH 5 for 1 minute, gas generation is considerably restrained.

As described above, according to the method of cleaning a substrate for a magnetic disk of an ion exchange strengthening type using ionic water including hydronium ions, the concentration of an alkaline component on the surface of the glass substrate can be reduced without deteriorating the surface roughness and effectiveness can be expected in preventing corrosion of a substrate and promoting the SN ratio of a medium which have been the problems of this type of substrate and in preventing corrosion of a magnetically recording film. The ion concentration used can pertinently be varied in accordance with glass components and conditions of ion strengthening and polishing method. That is, according to the present invention, attention is paid to a phenomenon where diffusion of an alkaline metal in glass is significantly expedited by hydronium ions $H_3O$ and an anodically electrolyzed water including a large amount of hydronium ions is used in cleaning a substrate for a magnetic disk of an ion exchange strengthening type. The anodically electrolyzed water is obtained by electrolysis of water, it is very active, it is selectively substituted for an alkaline component on the surface of the glass substrate, as a result, the anodically electrolyzed water can reduce the concentration of the alkaline component on the surface of the glass substrate. More characterizingly the substitution reaction in respect with the alkaline component is selectively carried out and accordingly, by setting preferably the concentration of the anodically electrolyzed water that is used pertinently, only the concentration of alkaline ions on the surface of the glass substrate can be reduced without deteriorating the surface roughness of the glass substrate which is a significant effect.

Further, generally, molecular size of anodically electrolyzed water is small and therefore, the permeability of water into micro cracks in the glass substrate is excellent and the water is permeable easily into cracks and accordingly, even if the alkaline component is present in cracks, the alkaline component in the cracks can efficiently be removed. Furthermore, the amount of other base ions other than hydronium ions is comparatively small and therefore, after the treatment of cleaning the glass substrate by using the anodically electrolyzed water, no special detergent using acid or alkali is needed and cleaning by high purity water is sufficient whereby an effect dispensing with an extra cleaning step which has been needed in the conventional technology, is achieved.

What is claimed is:

1. A method of cleaning and selectively removing an alkaline metal permeated on a surface of a glass substrate for a magnetic disk, comprising contacting a glass substrate for a magnetic disk pulled up from a chemically strengthening treatment solution by an alkaline ion exchange having an alkaline metal permeated on a surface thereof with an activated ionic water produced by an electric polarization under conditions effective to thereby selectively and essentially remove an alkaline metal permeated on a surface of the substrate.

2. The method according to claim 1, wherein the activated ionic water is an anodically electrolyzed water.

3. The method according to claim 1, wherein the activated ionic water is an anodically electrolyzed water having a hydrogen ion concentration of a pH of 5–6.

4. A method of making a glass substrate for a magnetic disk, comprising polishing a glass substrate pulled up from a chemically strengthening treatment solution by an alkaline ion exchange, after polishing of said glass substrate at a final stage of fabrication for finishing the glass substrate selectively removing an alkaline component permeated on a surface of the polished glass substrate by dipping into an activated ionic water produced by an electric polarization for a period of time and condition effective to selectively and essentially remove an alkaline component permeated on a surface of the glass substrate.

5. The method according to claim 4, wherein the glass substrate is polished to a roughness of 5 Å or less.

* * * * *